United States Patent
Fickartz et al.

(10) Patent No.: US 9,737,836 B2
(45) Date of Patent: Aug. 22, 2017

(54) FILTER ELEMENT

(71) Applicant: Carl Freudenberg KG, Weinheim (DE)

(72) Inventors: Knuth Fickartz, Schoenau (DE); Volker Braeunling, Heppenheim (DE)

(73) Assignee: CARL FREUDENBERG KG, Weinheim (DE)

( * ) Notice: Subject to any disclaimer, the term of this patent is extended or adjusted under 35 U.S.C. 154(b) by 284 days.

(21) Appl. No.: 14/616,805

(22) Filed: Feb. 9, 2015

(65) Prior Publication Data
US 2015/0224435 A1    Aug. 13, 2015

(30) Foreign Application Priority Data
Feb. 10, 2014  (DE) .................. 10 2014 001 607

(51) Int. Cl.
*B01D 46/00*  (2006.01)
*B01D 46/12*  (2006.01)
*B01D 46/52*  (2006.01)

(52) U.S. Cl.
CPC ....... *B01D 46/0023* (2013.01); *B01D 46/002* (2013.01); *B01D 46/008* (2013.01); *B01D 46/12* (2013.01); *B01D 46/521* (2013.01); *B01D 46/0057* (2013.01)

(58) Field of Classification Search
CPC .............. B01D 46/0023; B01D 46/008; B01D 46/002; B01D 46/12; B01D 46/521; B01D 46/0057
See application file for complete search history.

(56) References Cited

U.S. PATENT DOCUMENTS

| | | | | |
|---|---|---|---|---|
| 4,640,779 A | * | 2/1987 | Taki | B01D 27/06 210/493.5 |
| 5,266,195 A | * | 11/1993 | Hopkins | B01D 61/10 210/321.74 |
| 5,549,724 A | | 8/1996 | Mochida | |
| 5,972,059 A | * | 10/1999 | Morgan | B01D 46/002 55/336 |
| D428,128 S | * | 7/2000 | Gillingham | D23/365 |

(Continued)

FOREIGN PATENT DOCUMENTS

| CN | 1225032 A | 8/1999 |
|---|---|---|
| CN | 1332643 A | 1/2002 |

(Continued)

*Primary Examiner* — Amber R Orlando
*Assistant Examiner* — Britanny Precht
(74) *Attorney, Agent, or Firm* — Shumaker, Loop & Kendrick, LLP; James D. Miller

(57) ABSTRACT

A filter element includes a first bellows which is produced from a first filter medium, in view of the object of providing a filter element which after some service life can be readily modified in such a manner that said filter element again achieves an adequate filtration effect, is characterized in that a second bellows which is produced from a second filter medium is provided, wherein the second bellows is inserted into a recess of the first bellows and the periphery of the second bellows is partly or completely surrounded by the first bellows or wherein the second bellows is placed onto the first bellows in such a manner that the recess is covered by the second bellows and the fold tips of the bellows are aligned with one another.

18 Claims, 3 Drawing Sheets

(56) References Cited

U.S. PATENT DOCUMENTS

| | | | | |
|---|---|---|---|---|
| 6,258,144 B1* | 7/2001 | Huang | ............... | B01D 46/0049 |
| | | | | 123/593 |
| 6,480,381 B2* | 11/2002 | Negishi | .............. | H05K 7/20581 |
| | | | | 361/695 |
| 6,511,599 B2* | 1/2003 | Jaroszczyk | ........... | B01D 29/111 |
| | | | | 210/295 |
| 7,513,923 B1 | 4/2009 | Lewis et al. | | |
| 8,081,459 B2* | 12/2011 | Doll | ......................... | G06F 1/20 |
| | | | | 361/679.47 |
| 8,226,739 B1* | 7/2012 | McNatt | .................. | B01D 39/18 |
| | | | | 55/498 |
| 2006/0237357 A1* | 10/2006 | Jia | ........................ | G02B 26/008 |
| | | | | 210/330 |
| 2014/0363605 A1* | 12/2014 | Ogawa | .................. | A61F 15/006 |
| | | | | 428/43 |

FOREIGN PATENT DOCUMENTS

| | | |
|---|---|---|
| CN | 101940864 A | 1/2011 |
| CN | 103071326 A | 5/2013 |
| DE | 19816431 A1 | 10/1998 |
| DE | 20005756 U1 | 8/2000 |
| DE | 102005048841 B3 | 7/2007 |
| DE | 202008014270 U1 | 3/2010 |
| DE | 102009050697 A1 | 7/2010 |
| FR | 1407946 A | 8/1965 |
| JP | 11-351657 A | 12/1999 |

\* cited by examiner

FILTER ELEMENT

CROSS REFERENCE TO RELATED APPLICATION

This application claims priority to German Patent Application No. DE 10 2014 001 607.2, filed on Feb. 10, 2014, the entire disclosure of which is hereby incorporated herein by reference.

FIELD OF THE INVENTION

The invention relates to a filter element, and more particularly to a filter element having a first bellows configurable to receive a second bellows therein to restore an adequate filtration effect and adequate air permeability to the filter element.

BACKGROUND OF THE INVENTION

Filter elements which display a bellows from a non-woven material are already known from the prior art. A filter element of this type is disclosed, for example, in DE 10 2005 048 841 B3.

There, an air filter for a ventilation system of a motor vehicle, which displays a specially molded frame, is described. A first bellows from a first filter medium is received within the frame. The frame is designed in a particular way so as to be complementary to a filter housing.

The production of a filter element which displays a frame which is designed in a particular way is associated with high costs. The replacement of such a filter element, once the latter no longer develops an adequate filtration effect, is thus associated with comparatively high costs.

SUMMARY OF THE INVENTION

The invention is thus based on the object of stating a filter element which after some service life can be readily modified in such a manner that said filter element again achieves an adequate filtration effect.

The present invention achieves the abovementioned object by way of the features of claim 1.

It has been recognized according to the invention that a consumed filter element can be used for receiving a filter insert. The filter insert here according to the invention is designed so as to be a second bellows which is inserted into or placed onto a recess of the first bellows.

It has specifically been recognized that by way of combining two bellows, the physical properties of surface filtration and of deep filtration can be utilized in combination. Surface filtration takes place on the already saturated first filter medium of the first bellows. Deep filtration is performed by the second filter medium of the second bellows.

It has further been recognized that the partial further utilization of the already consumed first bellows no longer makes an expensive new purchase of a complexly constructed filter element having a frame a necessity. Insofar as the first bellows is provided with a functioning frame having sealing and guiding elements, that frame may be further utilized.

Merely regions of the first bellows, which on account of dust deposition display reduced air permeability and thus lead to adequate air supply to the vehicle interior being compromised, are replaced by the second bellows. A filter element which after some service life can be readily modified in such a manner that it again achieves an adequate filtration effect and adequate air permeability is thus stated.

As a result, the object mentioned at the outset is achieved.

The first bellows could be partly consumed, wherein regions of the first bellows are replaced by the second bellows in order for the filter element to be modified in such a manner that the latter again achieves an adequate filtration effect and displays adequate air permeability. In this manner, the physical properties of surface filtration and of deep filtration may be utilized in combination in that surface filtration takes place on the already saturated first filter medium of the first bellows, wherein deep filtration is performed by the second filter medium of the second bellows.

The first filter medium and the second filter medium could be identical or produced from a same type of material. Preferably, the filter mediums are produced from non-woven materials of the same type. If the first filter medium and the second filter medium are identical, the filter element can be substantially reinstated to the condition when new. On account thereof, the fundamental and characteristic properties of the filter element are hardly or only insignificantly modified.

A recess could be sunk into the first bellows, wherein the edges which border the recess are connected to an edge tape. The recess could be sunk by blanking, hot-wire cutting, sawing, or a similar method. An edge, namely a cut edge, is produced hereby. This edge is connected to an edge tape in order to facilitate the introduction of the second bellows into the recess.

Against this background, it is conceivable for the recess to display a characteristic shape into which only a characteristic second bellows which has been specially produced for this recess is insertable.

The edge tape could be designed so as to be self-adhesive. On account thereof, simple assembly is enabled.

The edge tape could be flexible or pliable. A flexible edge tape is easily expanded and easily adapts to surrounding structures.

The second bellows could be framed by an edge strip. On account thereof, it is ensured that the edge strip bears on the edge tape and with the latter forms a substantially tight interface. Against this background, it is conceivable for the edge strip and the edge tape to be interconnected in a materially integral manner. It is specifically conceivable for the edge tape to be adhesively bonded or welded to the edge strip.

The first bellows could be received in a frame, wherein the frame in its functionality is not compromised by the second bellows. Advantageously, the frame is not modified when the recess is sunk into the first bellows. On account thereof, a frame having specially produced guiding elements and sealing elements can be further used. Merely the first bellows is reconditioned in regions by inserting the second bellows.

The recess in the first bellows may assume almost any shape. It is conceivable for said recess to be rectangular, oval, or circular. However, irregular shapes are also conceivable. The edge tape which borders the recess preferably displays the same circumferential length as a blanking tool which is used. The edge tape may be flexible and perforated.

It is conceivable for a bio spray to be applied on the consumed first bellows. Other hygiene measures or means, respectively, of all types for establishing hygienic conditions are also conceivable. On account of the replacement of parts of the first bellows, a reduction in carbon dioxide is caused. Indeed, only consumed material is replaced, such that a resource-friendly construction of a filter element is implementable. A polypropylene frame can be used multiple times, being environmentally friendly.

It is even conceivable for a first recess to be sunk at a certain point in time into a first bellows, into which recess a second bellows is inserted, wherein after consumption of the second bellows a further, namely larger recess is blanked therein, in order to receive a newer second bellows. This may continue until the sinking of the recess would modify the frame of the filter element. To this extent a consumed filter element can be regenerated multiple times, as long as the sinking of the recess or the recesses, respectively, is performed in an appropriate manner.

In a method using a filter element of the type described here, the physical properties of surface filtration and of deep filtration could be utilized in combination in that surface filtration takes place on the already saturated first filter medium of the first bellows, wherein deep filtration is performed by the second filter medium of the second bellows. By way of such a method, used filter media can be meaningfully utilized.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
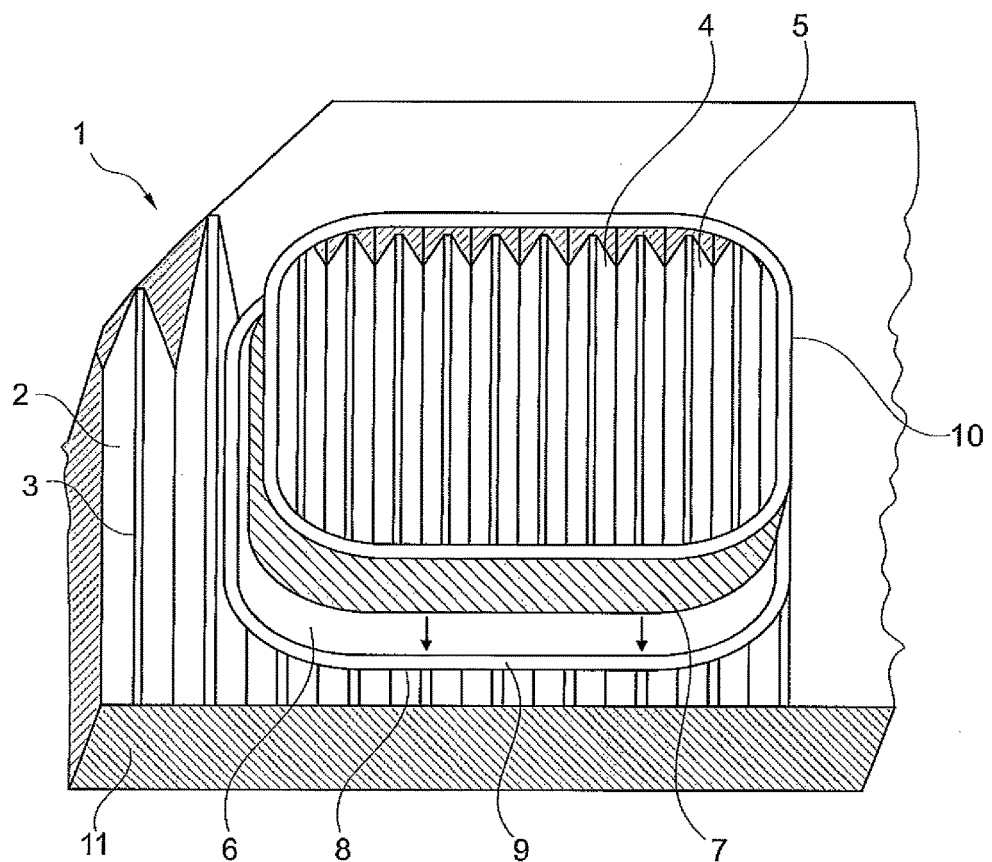
FIG. 1 shows a schematic illustration of a filter element of which the first bellows displays a recess into which a second bellows is fitted.

FIG. 1 shows a filter element 1, comprising a first bellows 2 which is produced from a first filter medium 3. A second bellows 4 which is produced from a second filter medium 5 is provided, wherein the second bellows 4 is inserted into a recess 6 of the first bellows 2, and wherein the periphery 7 of the second bellows 4 is partly or completely surrounded by the first bellows 2.

In the exemplary embodiment which is specifically shown, the periphery 7 of the second bellows 4 is completely surrounded by the first bellows 2.

The first bellows 2 is partly consumed, wherein regions of the first bellows 2 are replaced by the second bellows 4, in order for the filter element 1 to be modified in such a manner that the latter again achieves an adequate filtration effect and displays adequate air permeability.

The first filter medium 3 and the second filter medium 5 are identical, and namely are produced from a non-woven material of the same type.

A recess 6 is sunk into the first bellows 2, wherein the edge 8 which borders the recess 6 is connected to an edge tape 9.

The edge tape 9 is designed so as to be self-adhesive and is flexible. The edge tape 9 is produced from a non-woven material.

The second bellows 4 is framed by an edge strip 10. The edge strip 10 is produced from a non-woven material.

The first bellows 2 is received in a frame 11, wherein the frame 11 in its functionality and/or structure is not compromised by the second bellows 4.

By way of the filter element 1, a method in which by use of the filter element 1 the physical properties of surface filtration and of deep filtration can be utilized in combination is implementable, in that surface filtration takes place on the already saturated first filter medium 3 of the first bellows 2, wherein deep filtration is performed by the second filter medium 5 of the second bellows 4.

Figure 2:
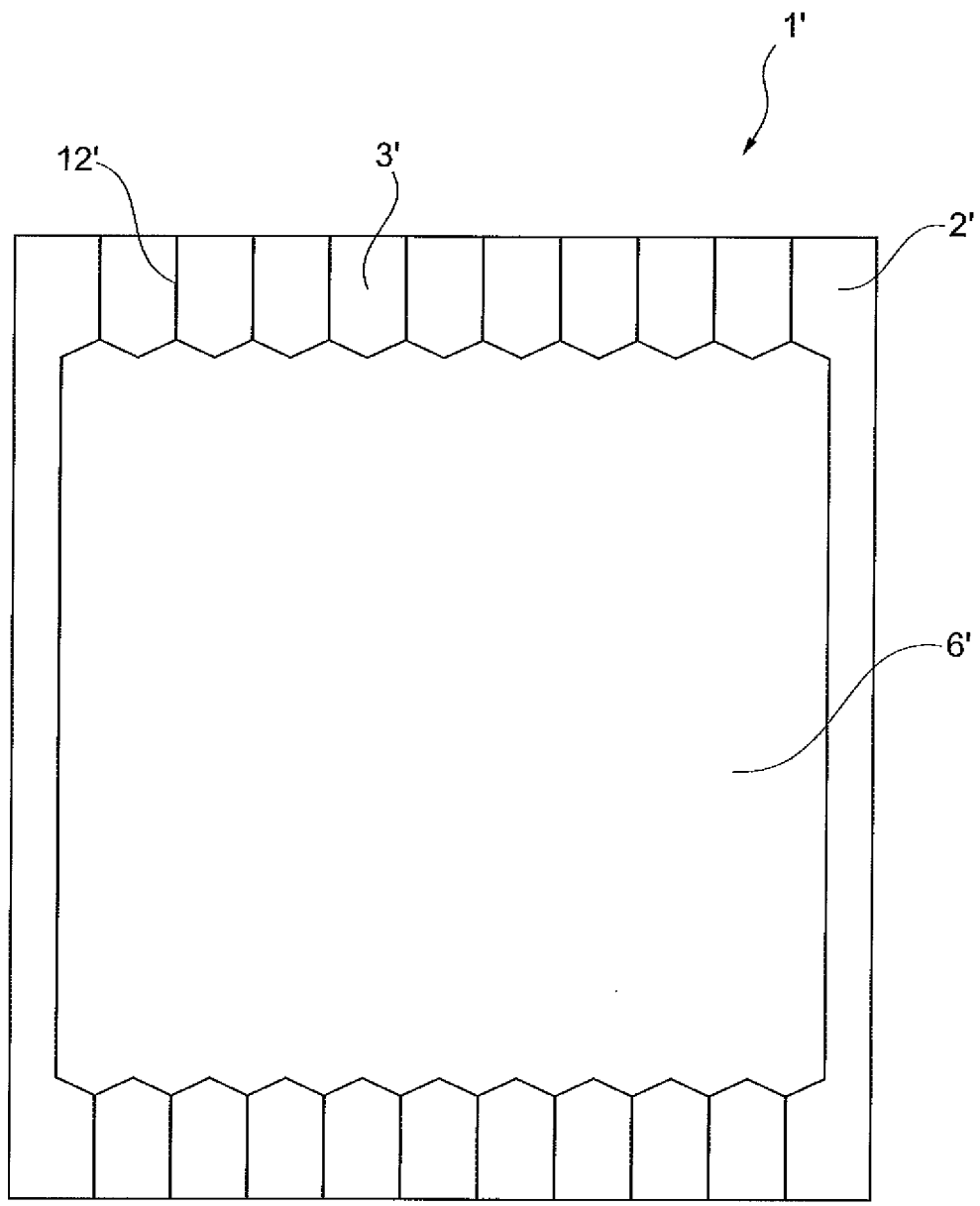
FIG. 2 shows a further view of a further filter element of which the first bellows displays a recess which has been created by the removal of a consumed filter medium.

FIG. 2 shows a filter element 1', comprising a first bellows 2' which is produced from a first filter medium 3'. A recess 6' is sunk into the first filter medium 3', since consumed filter medium 3' has been removed in regions.

Figure 3:
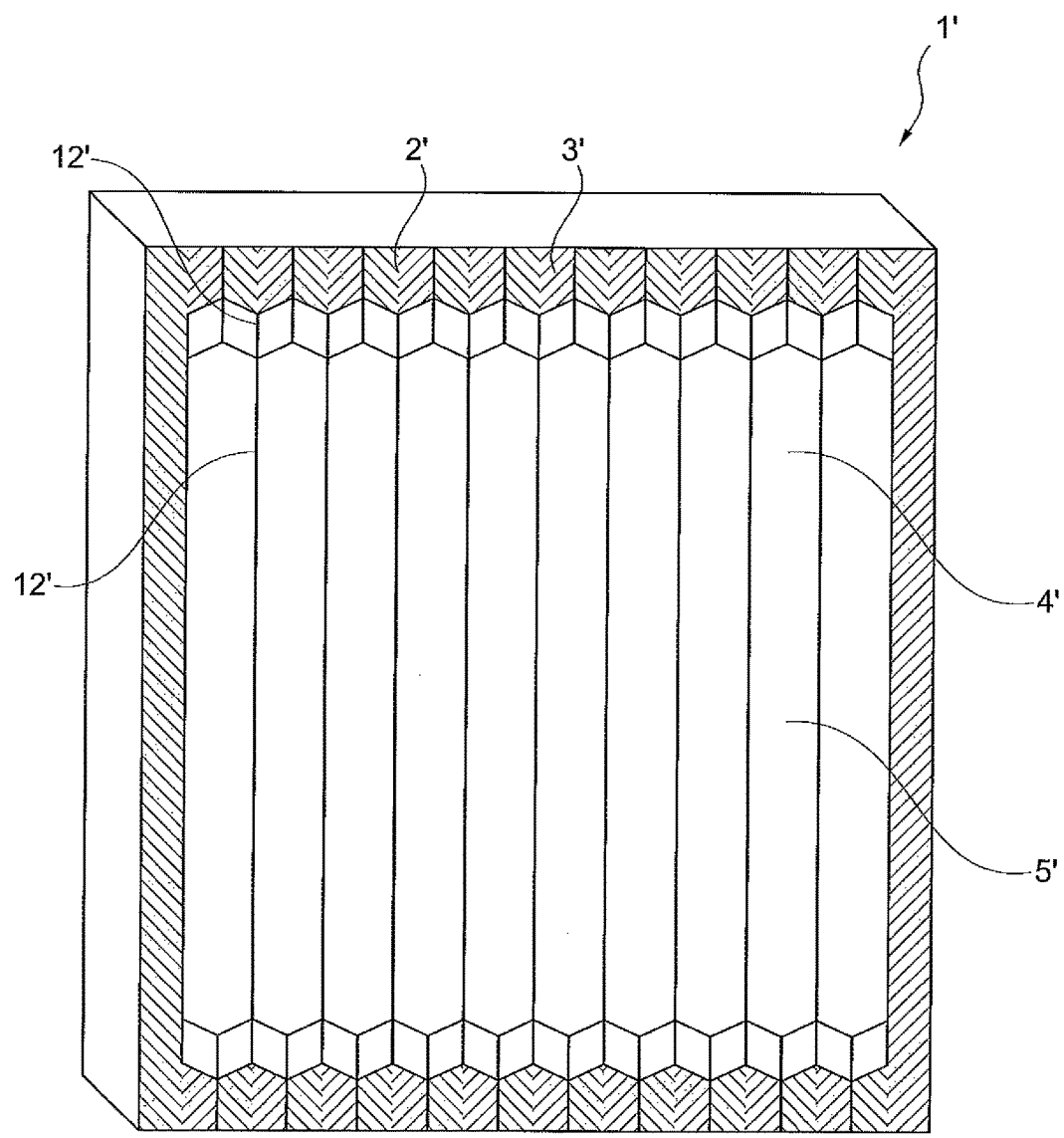
FIG. 3 shows the filter element according to FIG. 2, illustrating that the recess is covered by a new filter medium.

FIG. 3 shows the filter element 1' according to FIG. 2, comprising the first bellows 2' which is produced from the first filter medium 3'. A second bellows 4' which is produced from a second filter medium 5' is provided, wherein the second bellows 4' is placed onto the first bellows 2' in such a manner that the recess 6' is covered by the second bellows 4' and the fold tips 12' of the bellows 2', 4' are aligned with one another. Specifically, the fold tips 12' of the first bellows 2' engage in the fold troughs of the second bellows 4' once the second bellows 4' has been placed onto the first bellows 2'.

The second filter medium 5' is connected to the first filter medium 3' in such a manner that the first filter medium 3' is overlapped on all four sides of the recess 6'. The second filter medium 5' may be welded, adhesively bonded, or tightly connected to the first filter medium 3' in another way.

The method described earlier is also implementable using this filter element 1'.

While certain representative embodiments and details have been shown for purposes of illustrating the invention, it will be apparent to those skilled in the art that various changes may be made without departing from the scope of the disclosure, which is further described in the following appended claims.

What is claimed is:

1. A filter element comprising:
   a first bellows produced from a first filter medium, the first bellows including a region at least partially saturated with filtered material, a portion of the region of the first bellows removed to form a recess in the first bellows; and
   a second bellows produced from a second filter medium, wherein the second bellows is received in the recess formed in the first bellows with a periphery of the second bellows at least partly surrounded by the first bellows or wherein the recess is covered by the second bellows and all adjacent fold tips of the first bellows are aligned with fold tips of the second bellows, wherein the portion of the region of the first bellows removed to form the recess is replaced by the second bellows to restore the filter element to an original filtration effect and air permeability.

2. The filter element of claim 1, wherein the first filter medium and the second filter medium are produced from a same type of material.

3. The filter element of claim 1, wherein an edge of the recess of the first bellows includes an edge tape.

4. The filter element of claim 3, wherein the edge tape is a self-adhesive edge tape.

5. The filter element of claim 3, wherein the edge tape is pliable.

6. The filter element of claim 3, wherein the edge tape is produced from a non-woven material.

7. The filter element of claim 1, wherein the second bellows is framed by an edge strip.

8. The filter element of claim 7, wherein the edge strip is produced from a non-woven material.

9. The filter element of claim 1, wherein the first bellows is received in a frame, wherein the frame is not compromised by the second bellows.

10. The filter element of claim 1, wherein the second bellows is completely surrounded by the first bellows.

11. The filter element of claim 1, wherein the second bellows overlaps the first bellows around an entirety of the periphery of the second bellows.

12. The filter element of claim 11, wherein the second bellows is one of welded and adhesively bonded to the first bellows.

13. A method of using a filter element according to claim 1, the method comprising the step of utilizing physical properties of surface filtration and deep filtration in combination, wherein the surface filtration is performed on the first filter medium of the first bellows which is already saturated and the deep filtration is performed on the second filter medium of the second bellows.

14. A filter element comprising:
a first bellows produced from a first filter medium, the first bellows including a region at least partially saturated with filtered material, a portion of the region of the first bellows removed to form a recess in the first bellows; and
a second bellows produced from a second filter medium, wherein the second bellows is received in the recess of the first bellows with a periphery of the second bellows surrounded by the first bellows or wherein the second bellows is overlapping the first bellows around an entirety of the periphery of the second bellows and the recess is covered by the second bellows and all adjacent fold tips of the first bellows are aligned with fold tips of the second bellows, wherein the portion of the region of the first bellows removed to form the recess is replaced by the second bellows to restore the filter element to an original filtration effect and air permeability.

15. The filter element of claim 14, wherein an edge of the recess of the first bellows includes a self-adhesive edge tape produced from a non-woven material and the edge tape is pliable.

16. The filter element of claim 14, wherein the first filter medium and the second filter medium are produced from a same type of material.

17. The filter element of claim 14, wherein the second bellows is framed by an edge strip.

18. The filter element of claim 17, wherein the edge strip is produced from a non-woven material.

* * * * *